Figure 1:
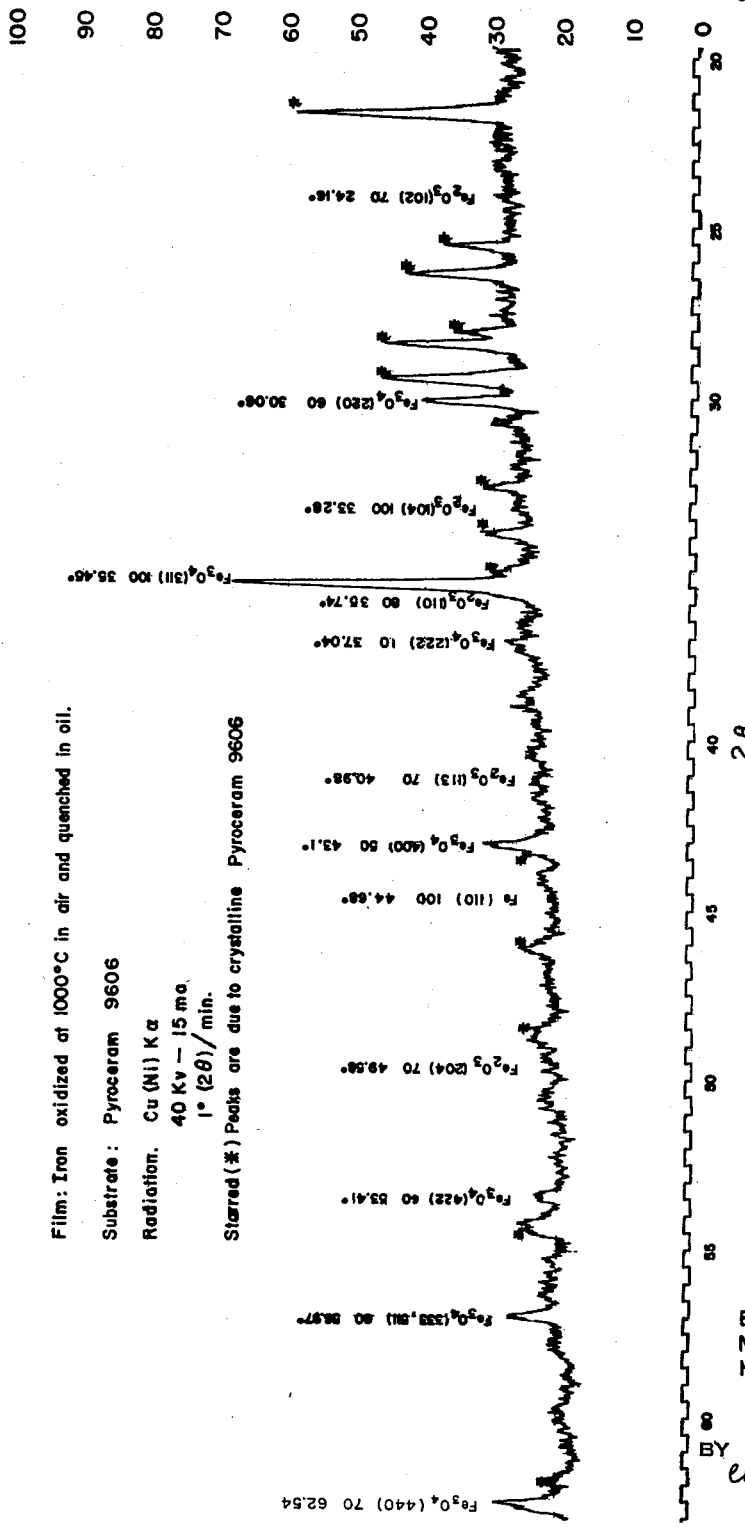

Ephraim Banks
Norman H. Riederman
Hubert W. Schleuning
INVENTORS

BY *Charles J. Elderkin*
ATTORNEY

Ephraim Banks
Norman H. Riederman
Hubert W. Schleuning
INVENTORS 3,148,079
PROCESS FOR PRODUCING THIN FILM
FERRIMAGNETIC OXIDES
Ephraim Banks, Brooklyn, Norman H. Riederman, Flushing, and Hubert W. Schleuning, Brooklyn, N.Y., assignors to Polytechnic Institute of Brooklyn, a corporation of New York
Filed Oct. 12, 1961, Ser. No. 144,780
17 Claims. (Cl. 117—62)

This invention relates to thin film ferrimagnetic oxides and to the method of making the same. The invention utilizes vacuum deposition techniques as an integral part of the method.

Due to the recent interest in thin magnetic films, many studies have been made to determine new means of producing ferrimagnetic oxide (ferrite) films. Prior workers have attempted to sputter nickel ferrite crystals on to glass and fused quartz substrates, in argon and oxygen atmospheres, but could not clearly demonstrate the magnetic spinel structure in the film formed due to an unexplained loss of nickel. Experiments directed at vacuum evaporating nickel ferrite crystals also met with little success due to decomposition of the oxide structure coupled with evaporation source failure. More recently, light brown, non-conducting, ferrimagnetic oxide films have been prepared by pyrolytic spraying of complex acetylacetonate solutions in organic solvents onto alumina substrates. Also, ferrite elements, of thicknesses in the 50,000–500,000 A. range, have been produced from sintered products made from calcined elements.

The object of this invention is to provide a method of preparing thin ferrimagnetic oxide films, which can be used in high-speed switching circuits, and as circulators and other types of control elements in microwave systems.

These films can be utilized in high-speed switching circuits for digital computers. The high switching speeds are a consequence of the short distances which must be traversed by magnetic domain boundaries in order to reverse the directioin of magnetization. Films of ferrites of suitable composition may be used as control elements in microwave circuits, by virtue of their Faraday magneto-optic rotation properties, their high resistivity, which minimizes eddy current losses, and their extremely small thickness, which facilitates their accurate placement in waveguides and resonant cavities, permitting their use at higher frequencies, where these elements have extremely small dimensions.

By vacuum deposition is meant the deposition of an inorganic thin film of suitable thickness onto a suitable substrate material, whether organic or inorganic, in an atmosphere of less than $10^{-4}$ mm. Hg pressure. The atmosphere may consist of a reactive gas such as air (approximately 0.21 atm. $O_2$) or a non-reactive atmosphere such as argon, krypton. It is only necessary that the mean free path of the evaporant be greater than the distance between the evaporation source and the surface upon which the desired thin film element condenses.

By a thin film is meant a homogeneous deposit of material, whether pure metal, alloy, or oxide mixture of varying length and width, and with thickness between $10^2$ A. and $10^5$ A.

Before the true nature of the present invention can be understood, it is necessary to consider briefly the composition and structure of ferrites. The general chemical formula of ferrites possessing the structure of the mineral spinel, $MgAl_2O_4$, is $M^{II}Fe_2^{III}O_4$, whereas $M^{II}$ represents a divalent metal ion with an ionic radius approximately between 0.6 and 1 A. In the case of simple ferrites, $M^{II}$ is one of the divalent ions of the transition elements $Mn^{+2}$ (ionic radius of 0.80 A.), $Fe^{+2}$ (0.75 A.), $Co^{+2}$ (0.72 A.), $Ni^{+2}$ (0.69 A.), $Zn^{+2}$ (0.83 A.), $Cu^{+2}$ (0.9 A.), or $Mg^{+2}$ (0.65 A.). A combination of these ions is also possible which is termed a solid solution of ferrites.

The trivalent iron ions ($Fe^{III}$) in $M^{II}Fe_2^{III}O_4$ can completely or partly be replaced by another trivalent ion such as $Al^{III}$, thereby yielding a ferrialuminate $$(M^{II}Fe_{2-x}^{III}Al_x^{III}O_4)$$

The smallest cell of the spinel lattice has cubic symmetry and contains eight units or "molecules" of $M^{II}Fe_2O_4$. 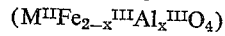 The relatively large oxygen ions, $O^{-2}$ (1.40 A.), form a face-centered cubic lattice. In this type of cubic close-packed structure, two types of interstitial sites occur, the tetrahedral and octahedral sites which are surrounded by four and six oxygen ions respectively. There are sixty-four tetrahedral sites and thirty-two octahedral sites present in the above mentioned cell. Spinels having a distribution of eight divalent ions in tetrahedral sites and sixteen trivalent ions in octahedral sites are called normal spinels, while those spinels having a distribution of the eight divalent ions in eight of the sixteen available octahedral sites, and with the sixteen trivalent ions uniformly distributed over the remaining sites are called inverse spinels. The magnetic ferrites are primarily of this latter type.

The present invention consists of the deposition of films of pure metal alloys or partial oxide mixtures onto suitable substrates and the controlled oxidation of said films on the substrates to obtain ferrimagnetic oxide films.

Before considering the process of the invention in detail, it is believed that some attention to the equipment and materials involved will prove helpful.

The invention may utilize conventional evaporation systems (commercially obtained or fabricated), extensively discussed in the literature, and which consist mainly of an evaporation chamber (glass or metal) and an exhausting system to obtain the desired conditions for vacuum deposition. The design of the system is unimportant so long as the desired pressure is maintained just prior to and during the actual deposition. The systems must contain an appropriate heating device so that the evaporant may be heated to the evaporating temperature, and suitable substrate supports to position the substrates in the metal vapor stream during deposition.

Additionally, the evaporation system should contain electrical feed-through from the surrounding atmosphere to the inside of the evacuated chamber, so that temperature and electrical resistance of the deposited films may be monitored during and immediately after a run. Transparent ports in the walls of the evaporation chamber are necessary to facilitate optical transmission and reflectance measurement during and immediately after a run. These ports may also be utilized for temperature measurements utilizing conventional optical pyrometer techniques. Suitable mechanisms for the incorporation of rotary motion into the chamber to facilitate the movement of substrate holders and shielding devices during deposition are of assistance, and, of course, heating devices, such as optical heaters and infra-red lamps in and around the chamber to outgas the system prior to deposition, substrate heaters, low temperature coil and Deway-type substrate supports, are required.

Heating of the evaporant up to and above the initial evaporation temperature in a vacuum can be performed in several ways, but resistance heating of a non-reactive, refractory ceramic crucible which contains the evaporant is perhaps the simplest. Suitable crucibles are vitrified alumina, zirconia, magnesia, beryllium oxide and boron nitride. The heating element may be a coil of tungsten, molybdenum or tantalum. A non-reactive, refractory metal boat or line source in intimate contact with the evaporant can also be resistively heated.

Alternatively, a pure carbon rod containing the evaporant in a thinned-out portion of the rod, or high-frequency heating may be used. Electron bombardment heating and electron beam heating have also been successful.

The substrates on which the films are formed prior to the oxidation portion of the process must not chemically react in a detrimental manner with the vacuum deposited film either during vacuum deposition or subsequent high temperature oxidation. The substrate's properties must be sufficiently well known so that properties of the film can be directly attributed to the film itself and can be segregated from that of the substrate surface. Also, the ferrimagnetic oxide film's adherence to the substrate surface must be strong. We have found that the following substrates satisfy these requirements: amorphous silicates (fused quartz), crystallized glass (Pyroceram, trademark), high-alumina ceramics (Al Si Mag, trademark), natural or synthetic minerals ($MgAl_2O_4$ or $Al_2O_3$ single crystals), and synthetic micas (Flurophlogopite).

The methods of cleaning of the substrate surfaces are quite well known in the art and a detailed example is given below. However, applicable methods are: detergent cleaning, chemical etch, gas discharge cleaning, and high temperature firing in a non-reactive atmosphere.

The evaporant should consist of metals or alloys mixtures of greater than 99% chemical purity, fabricated into wire, rod, flakes or ingots. The evaporant may be chemically cleaned before being placed in or upon the evaporation source so that surface contamination is obviated, and it is preferable to outgas the evaporant in vacuo prior to deposition.

Turning now to the process measures of the invention, metal alloy film is vacuum deposited from an appropriate source in a vacuum atmosphere of less than $10^{-4}$ mm. Hg pressure onto a suitable substrate, as described above. Oxidation of the deposited film then takes place. It is necessary that the alloy film have the same atomic ratio of metal atoms as the oxide film will have after the oxidation takes place:

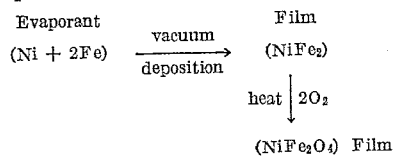

It should be noted that, since the "sticking coefficient" of inorganic substances varies both with substrate material and substrate temperature, it is necessary to vary the evaporant's atomic ratio of metals to obtain the correct cation ratio in the final oxide film, e.g.

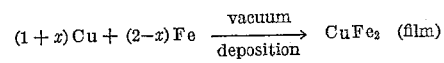

where $x$ is determined empirically.

The multi-metallic evaporant may be evaporated from a single source to obtain an alloy film. In favorable cases, however, the constituent metals may be either simultaneously or consecutively evaporated from a number of sources in the evaporation system. If the evaporant is a previously formed alloy ingot it is not necessary to use a multitude of sources to effect the proper weighing of the constituent metals, but it is preferable to evaporate "to completion."

Once the alloy film is formed on the substrate it may either be removed from the evaporation chamber and placed into a furnace which has provisions for atmosphere and temperature control or it may be oxidized in situ by admitting a suitable atmosphere into the previously evacuated chamber and heating. Experimentation has shown that air (approximately 0.21 atm. $O_2$), pure oxygen and wet oxygen are suitable as oxidizing atmospheres. Oxidation of the films and ferrimagnetic oxide structure formation takes place between 650° C. and 1200° C. Oxidation times range from 3 minutes to more than 2 days. Cool-down rates from oxidation temperatures to ambient temperatures may range from 500° C. per minute to 10° C. per hour.

This method also allows a magnetic field to be impressed across any dimension of the film either during vacuum deposition, high temperature oxidation or cooling through the Curie point and below, if so desired. By utilizing the invention it is possible to evaporate onto flat surfaces, convex surfaces and concave surfaces. Any design can be formed on a substrate by either allowing the vapor stream to pass through a suitably cut-out mask before deposition onto the substrate surface takes place, mechanically removing portions of the film after alloy deposition, or chemically milling with an acid etching reagent.

Films which have been formed by utilizing this invention include cubic spinel type ferrites, e.g., $NiFe_2O_4$, $(Mn_{1-x}Mg_x)Fe_2O_4$, $Ni(Fe_{2-x}Al_x)O_4$ and garnet-type ferrimagnetic oxide films, i.e., $Y_3Fe_5O_{12}$—$\alpha$-$Fe_2O_3$.

The properties of the ferrimagnetic oxide films formed utilizing this invention that have been investigated include crystal structure as determined by X-ray powder diffractometry; saturation magnetization as determined by microwave resonance measurements, optical absorption in the ultra-violet, visible and infra-red regions of the spectra, direct current electrical resistance and chemical reactivity.

It is believed that a more complete understanding of the present invention will be gained by referring to the following examples of specific embodiments thereof. For convenience and ease of understanding, these embodiments have been grouped in three sections: equipment and materials, production of the films, and properties of the films.

EXAMPLES

Materials and Equipment

Two evaporation systems were employed during this investigation: an experimental unit containing a bell jar 10 in. in diameter by 18 in. high resting on a brass, water-cooled baseplate, and a standard New York Air Brake Vacuum Coater containing a bell jar 18 in. in diameter by 30 in. high. (The latter unit also contained a liquid nitrogen cold trap.)

Both systems were equipped with sufficient terminals through the base-plate for electrical supply to filaments and optical heater, and to allow temperature and resistance measurements to be made during a run. The baseplates were also equipped with rotary seals for facilitating movement of shields in the system in vacuo.

The optical heaters were covered with stainless steel heat shields and the filaments surrounded by glass shields, so as to protect the bell jar from being coated during an evaporation cycle. This arrangement allowed the system to be easily cleaned after each cycle of operation.

Both systems employ oil diffusion pumps backed by mechanical fore pumps. The ultimate pressure obtainable in the small system is $9 \times 10^{-6}$ mm. Hg, while the larger system can be evacuated to $5 \times 10^{-7}$ mm. Hg after substantial bake-out periods. Pressures are indicated by VG-1A ionization gauges located in the base-plates.

In all of the evaporation experiments conducted in the small system, the source-to-substrate distance was 9 in., while in the larger system a distance of 14 in. was maintained. A stainless steel shield was positioned between the source and substrate so that the substrates were not exposed to source contamination during the system's bake-out period, or during the time that the source was being brought up to temperature.

The pressure in the vacuum chamber during metallic deposition was $2-4 \times 10^{-5}$ mm. Hg with the substrate temperature, at the onset of deposition, being 25–30° C. The temperature was raised as high as 200° C. at the completion of a run due to the radiant heat of the source.

It is generally known that a cold substrate leads to a poorly crystallized film containing structural defects. Such a surface is normally highly reactive, probably due to the fact that grain boundaries can act as highly conducting channels for atomic diffusion. As this state of affairs would speed up the oxidation procedures (described below), all runs were initiated at 25–30° C., the lowest temperatures attainable in these evaporation systems as they lacked cold fingers or other suitable substrate cooling devices.

The following evaporation sources have been used:

(1) Three-strand, braided tungsten wire (0.020 in. diameter).

(2) Tungsten wire baskets coated with Alundum cement (Norton Co.).

(3) Thin walled, vitrified alumina crucibles (McDaniel Refractory Porcelain Co.), approximately ½ in. high by ⅜ in. diameter, placed in tungsten wire baskets and then coated with Alundum cement to facilitate heat transfer.

(4) Zirconium oxide crucibles placed in tungsten baskets and coated with Alundum cement.

(5) Boron nitride crucibles (Carborundum Co.) placed in tungsten baskets and coated with Alundum cement.

Experimentation showed that the three-strand, braided tungsten wire is only suited to evaporating a limited charge of iron, nickel, or iron-nickel combinations because of the solubility of tungsten in molten iron or molten nickel.

The crucibles, after being thoroughly out-gassed at red heat in vacuo, allowed the evaporation of thick, low ohm/square films. The vitrified alumina crucibles exhibited the most reliable evaporation characteristics.

The service life of these crucibles is one cycle of operation without breakdown, and it is certainly not in the best interest of producing uncontaminated films to use these types of sources more than once.

Prior to evaporation, the glass and fused quartz substrates are thoroughly cleaned by a procedure consisting of a number of steps, as follows:

(1) Visual inspection for scratch marks and other defects, discarding those pieces which show any flaws.

(2) Rinse in tap water to remove large dust particles.

(3) Rinse in dilute solvent solution to degrease.

(4) Gently rub with water suspension of Bon Ami to remove residual dirt.

(5) Rinse in warm tap water, (from this point on, the substrate is handled solely with cleaned, nickel-plated, pointed tip tweezers).

(6) Rinse with hot, freshly distilled water.

(7) Rinse with freshly distilled acetone.

(8) Visual check for spots, water stains, etc.; if any flaws are noticed at this point, discard substrate.

(9) Load into stainless steel evaporation mask and place into the evaporation bell jar.

(10) Evacuate bell jar as quickly as possible, in order to prevent further accidental contamination.

The ceramic pieces are cleaned by firing at 1000° C. for a period greater than 15 minutes, then loading into substrate holder contained in the evaporation system while the substrates are still at red heat and evacuating the bell jar as quickly as possible. In vacuo, both types of substrates are subjected to a 300° C. heat treatment, for a period not less than one hour.

It should be noted that substrates of both types can be placed in special stainless steel evaporation masks so that steps are developed in some of these films. These films are subsequently used to determine film thickness by utilizing the Tolansky multiple beam interferometry method or the Newton ring method.

The various substrates used in this investigation were, Amersil optical grade fused quartz, Pyroceram 9606 (trademark), Pyroceram X609FPD (trademark) and Al Si Mag 614 (trademark). Pittsburgh non-corrosive precleaned microscope slides were used exclusively as resistance strips during an evaporation run.

The crystallized silicate, Pyroceram 9606 (trademark), along with the high alumina content Al Si Mag 614 (trademark), provided the most suitable substrate materials for adherent films of the oxides and were highly amenable to X-ray, micro-wave, and electrical analysis. Fused quartz proved to be a rather poor substrate, since the oxidized films had a tendency to flake off, but it was the substrate most suited to optical analysis. While the Pyroceram X609FPD (trademark), provided a substrate to which the film adhered to strongly, it recrystallized upon prlonged heat treatment and this may have a pronounced effect on film properties.

A comparison of the coefficients of thermal expansion, $\alpha$, of bulk ferrites and the substrate materials clearly shows $\alpha$ to differ in all cases. This discrepancy does not seem to harm the adhesive properties, except in the case of the optically polished fused quartz. This leads one to believe that the rougher surfaces of the ceramics are a definite aid in the adhesion of $\sim 10^3$ A. films.

*Production of Films*

Magnetite films, $Fe^{II}Fe_2^{III}O_4$, were the first ferrimagnetic oxide to be investigated as they contain only one type of metal atom. All attempts at preparing this type of film through the controlled oxidation of 5 ohm/square iron films in oxygen, air (0.21 atm. $O_2$), and nitrogen atmospheres at temperatures below 600° C. met with failure. The end product was always the red, non-magnetic hematite, $\alpha\text{-}Fe_2O_3$. Since at temperatures above 900° C. there is an appreciable probability that oxygen anions will separate from the cations and escape as oxygen gas, and as a result the positive charge on some or all of the cations is reduced, ideally giving

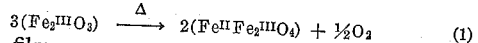

(1)

pure iron films were evaporated onto the ceramic substrates and oxidized in air at 1000° C. By cooling slowly or quenching in air, hematite was always found to be the end product, due to a reversal of Equation 1,

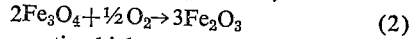

(2)

The black, magnetic, high temperature form of the iron oxide was trapped by quenching the samples in Haughton 1865 EFH quenching oil. A brass tube, closed at one end, was partially filled with the oil which was kept at 0° C. by means of an ice-water bath surrounding the tube, and the samples were quenched from 1000° C. to 0° C. in less than three seconds. This oil was chosen because it was readily available and because it contains an anti-oxidant. Its flash point, being high, allows objects of 1000° C. to be quenched without fear of combustion taking place. This black oxide film, which proved to be magnetite, was subjected to X-ray analysis and other tests described below.

The next problem considered was the mixing, in film form, of the metals, iron and nickel, as closely as possible in a 2:1 ratio and the subsequent oxidation, so that

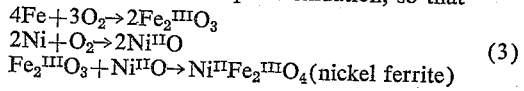

(3)

Note that the formulas do not necessarily indicate the kinetics of the reaction, but do indicate the overall stoichiometry.

This was accomplished in a number of ways:

(a) Successive evaporation of Fe–Ni–Fe layers, then oxidation,
(b) Successive evaporation of Fe–Fe–Ni layers, then oxidation,
(c) Successive evaporation of Ni–Fe–Fe layers, then oxidation,
(d) Evaporating a 2:1 atomic ratio Fe:Ni mixture to completion from a single source.

Oxidation times ranged from 3–28 hours at temperatures of 900–1100° C. Cool down times averaged 8 hours. All of the methods listed above gave uniform films, but the films which were evaporated utilizing methods (a), (b), and (c) had a tendency to flake off the substrates after they had been oxidized from the pure metallic form to the magnetic oxides. This was probably due to the excessive thickness $\sim 10^4$ A.) of the metallic oxide layers, which on cooling, would lead to intensified stress between the oxide film and substrate. Method (d) proved to be most successful in giving highly adherent films. Pure oxygen as well as air atmospheres were utilized in fabricating the films.

Because it is common practice among manufacturers of ferrite materials to fabricate their products by ceramic techniques utilizing temperatures exceeding 1200° C., we attempted to oxidize at temperatures up to 1350° C. In all cases the films were lost, leaving a cleaned substrate if the films were left at these elevated temperatures for any period of time because of the re-evaporation of the metal film at higher temperatures.

Following the above outlined procedure, many types of bi- and trimetallic ferrite films have been made by evaporated analytically weighed atomic ratios of metals essentially to completion, followed by in situ oxidation. Results are shown in Table I:

TABLE I.—FERRIMAGNETIC OXIDE SAMPLES

| | Metals | Atomic Ratio of Metals in Crucible Melt |
| --- | --- | --- |
| Magnetite | Fe | 100 |
| Nickel Ferrite | Fe:Ni | 64.6:35.4 |
| Cobalt Ferrite | Fe:Co | 68.3:31.7 |
| Copper Ferrite | Fe:Cu | 60:40 |
| Magnesium Ferrite | Fe:Mg | 66:34 |
| Nickel Zinc Ferrite | Ni:Zn:Fe | 20.8:24.6:54.6 |
| Manganese Magnesium Ferrite | Mn:Mg:Fe | 11:34:55 |
| Nickel Ferri-aluminate | Fe:Al:Ni | 31.9:32.8:35.3 |

Properties of the Films

As the process of our invention can only be said to be successful if in fact the desired structures are obtained, careful measurements of the structure and properties of the films produced as described above were taken.

Figure 2:
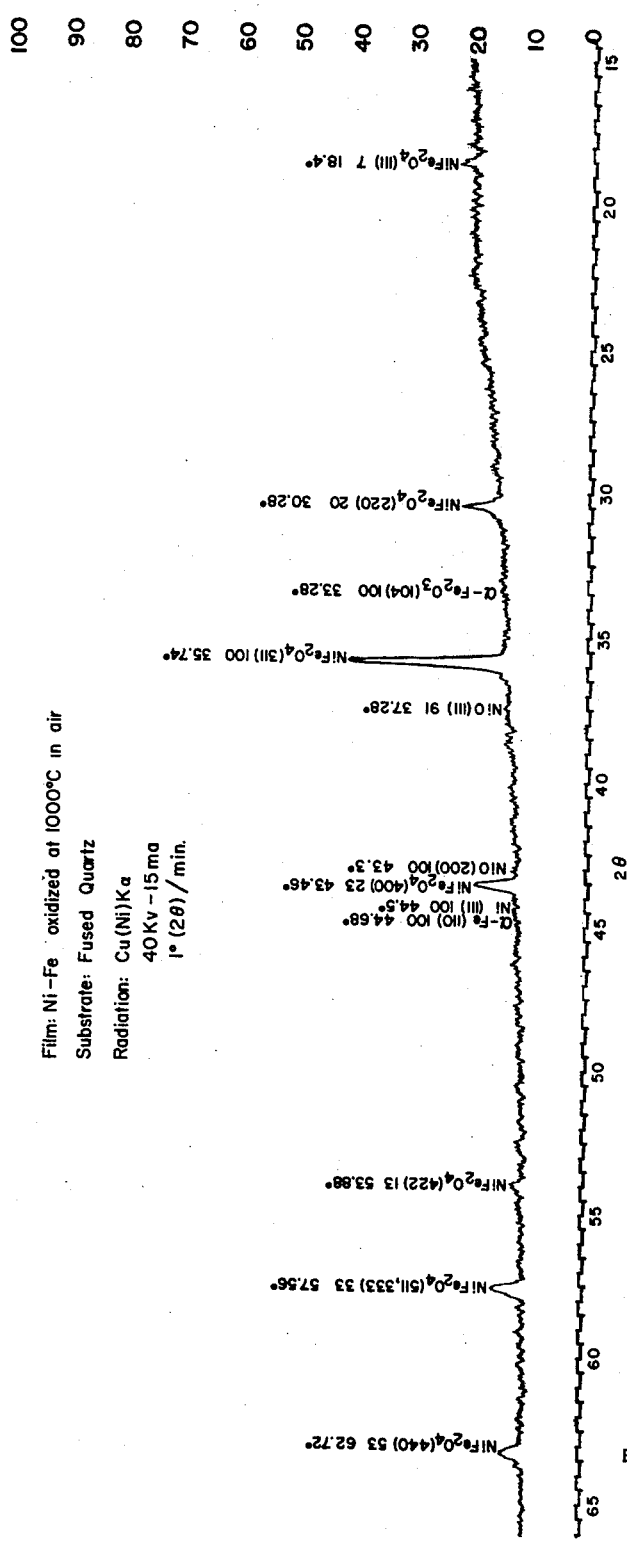
Figure 3:
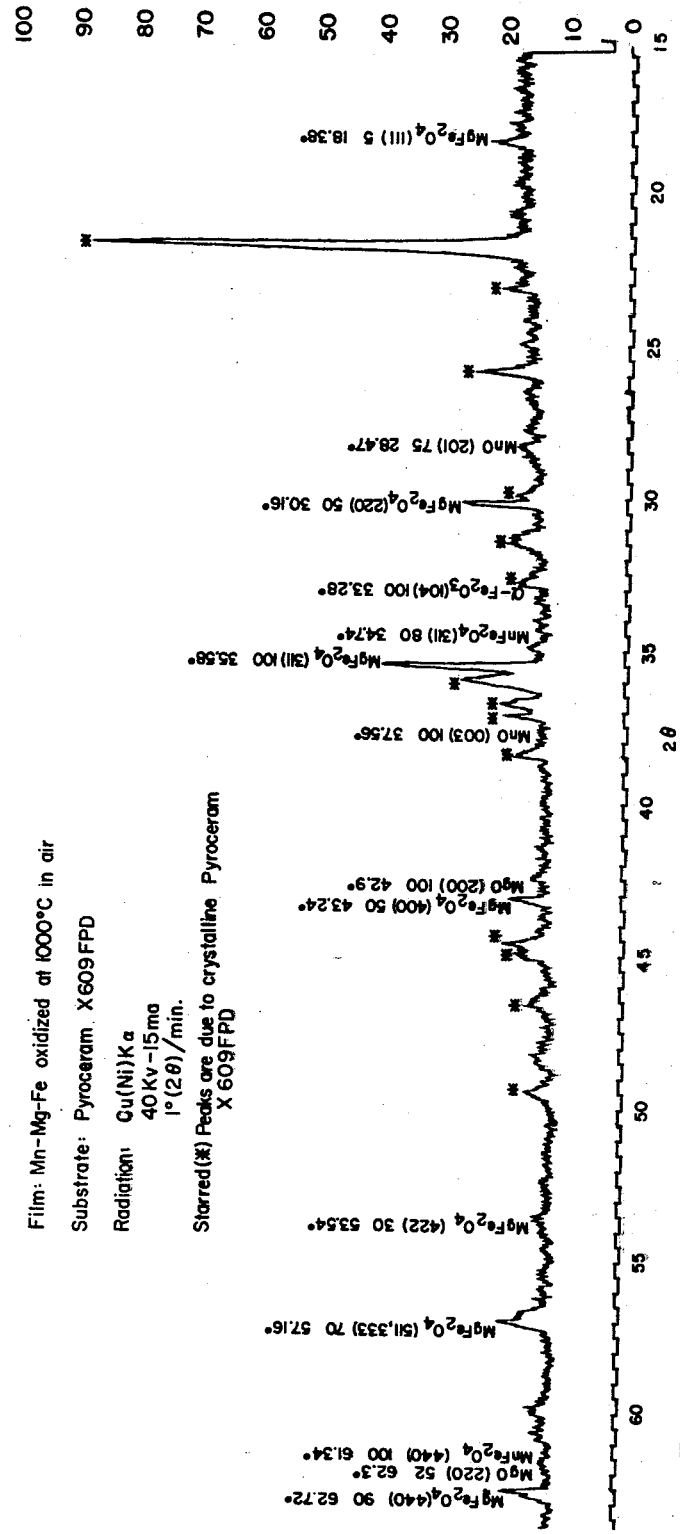

By utilizing a Norelco X-ray Powder Diffractometer, diffraction patterns of the thin oxidized films were obtained and identified. Copper radiation (nickel filtered) was deemed adequate for this study even though the background intensity was raised due to iron fluorescence. The patterns obtained were compared, as to peak placement ($2\theta$ value) and relative intensity of the peaks, with the patterns that would be expected when using the American Society for Testing Materials (ASTM) index cards for the individual ferrites as standards. In the greater majority of films, only the diffraction peaks of a single phase ferrite material were noted. FIGURES 1, 2, and 3 are examples of patterns obtained for mono-, bi-, and trimetallic oxide films. In particular, FIGURE 1 is a diffraction pattern of magnetite film, FIGURE 2 is of a nickel ferrite film, and FIGURE 3 is a magnesium manganese ferrite film. In these figures the molecular formula, hkl values, relative intensity of peaks, and $2\theta$ values as calculated from the ASTM index have been lettered in. This has given us a means of noting the absence of all oxide peaks save those of the cubic spinel. Excesses of $\alpha$-$Fe_2O_3$, unoxidized Fe and $M^{II}O$ were looked for, but seldom found, so that it may be concluded that the films were solely cubic spinels.

It would have been advantageous to calculate the "d" spacings of the unit cells and compare those with the bulk values to determine if any dissolved wüstite, FeO, phase was present. Unfortunately, the diffraction peaks broaden and decrease in intensity at the higher values of $2\theta$ thereby preventing the calculation of meaningfully precise lattice constants.

A draw-back to this X-ray method is the appearance of strong individual peaks due to the crystallinity of the ceramic substrates used. However, these peaks were identified as being due to the substrate material and starred (*), before any identification of the oxide films was attempted.

Another method of determining structure is the measurement of D.C. resistance and comparison with known standards.

Platinum-Gold Hanovia No. 14 suspension was applied as conductive collaring material to many of the ceramic substrates previous to deposition of the various pure metal and alloy films. The organic carrier material of the suspension was burned-off by firing the coated substrates for 10 minutes in air at temperatures ranging from 620–1000° C. After oxidizing the evaporated metal films, the D.C. resistance of the films ($\sim$2 squares in area) were measured by applying copper pressure contacts to the noble metal collars.

Values for resistivities, reported in the literature, range from $5.3 \times 10^{-2}$ ohm-cm. for quenched samples of magnetite to $7 \times 10^{-3}$ ohm-cm. for polycrystalline magnetite. Ferri-magnetic oxides of the $M^{II}Fe_2^{III}O_4$ type spinel structure usually have resistivities as high as $10^5$–$10^9$ ohm-cm. The resistivity values of the ferrites are highly dependent on the atmosphere, whether oxidizing or reducing, utilized in the oxidation step of the preparation.

The resistance values obtained for the ferrite films, as shown in Table II, compare favorably with the bulk values for resistivity $\rho b$, if we assume a film thickness in the $10^{-5}$ cm. ($10^3$ A.) region. This assumption is not considered to be overly optimistic since many of the unoxidized films, deposited on glass microscope during the same run as those films deposited on ceramic substrates, were transparent to visible light, thereby indicating a thickness in the $10^{-6}$ cm. region. Other unoxidized films of resistances $10^{-2}$ ohm/square were opaque, indicating thickness values in the $10^{-5}$ cm. region.

TABLE II.—Experimentally Obtained D.C. Resistance Values

| Film [1] | D.C. resistance (ohms) |
| --- | --- |
| Magnetite | $3 \times 10^3$ |
| Nickel ferrite | $10^{12}$ |
| Cobalt ferrite | $>10^{14}$ |
| Copper ferrite | $5.3 \times 10^9$ |
| Magnesium ferrite | $10^{13}$ |
| Magnesium manganese ferrite | $5 \times 10^{12}$ |
| Nickel zinc ferrite | $6.9 \times 10^{11}$ |
| Nickel ferrous ferrite [2] | $4.3 \times 10^3$ |
| Nickel ferri-aluminate | $2.4 \times 10^{11}$ |
| Quartz | $>10^{14}$ |
| Pyroceram | $>10^{14}$ |
| Pyroceram X609 FPD | $>10^{14}$ |
| Al Si Mag 614 | $>10^{14}$ |

[1] Film areas are approximately 2 squares.
[2] Oxide sample quenched in air from 1000° C. to 25° C.

A special note on nickel ferrous ferrite is necessary. A study of the effect of quenching in 2:1 Fe-Ni oxidized samples was undertaken in order to obtain an insight into the chemistry of nickel ferrus ferrite,

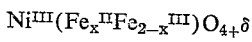

A wide variation in resistance values was found between the $10^{12}$ ohm/square of nickel ferrite and the $10^3$ ohm/square of magnetite.

Samples were quenched in oil, at room temperature, in 50° C. intervals from 1000–600° C. The films quenched from 1000° C. were highly conducting ($\sim 5 \times 10^3$ ohm/square), indicating a substantial amount of ferrous ion in the sample, while those films quenched from 600° C. were highly resistive ($10^{12}$ ohm/ square), indicating very little or no ferrous ion present. Samples quenched at the intermediate temperatures showed a progressive increase in resistance as the temperature was lowered and it is felt that the resistance increase can be directly attributed to the decrease in the value of $x$.

In the course of the investigation, chemical destruction of the ferrite films was attempted by acid attack. Cold concentrated HCl, $H_2SO_4$, $HNO_3$, and aqua regia proved inadequate. Concentrated HF tended to destroy the fused quartz and other silicate substrates, thereby freeing portions of the films from these substrates. On treating in hot (85° C.) 4 N $H_2SO_4$ for three days, some of the nickel ferrite film on a fused quartz substrate was destroyed.

The films are rather hard, as might be expected of ceramic materials. They are not removed from the substrates by a vigorous rub with a cloth or rubber eraser, nor can the film be lifted by applying cellophane tape and pulling.

Microwave absorption measurements in the X-band region ($\sim$9300 mc./s.) were made on the film samples by utilizing a rectangular transmission $TE_{102}$ cavity and other commercially available microwave test equipment. All measurements were conducted at ambient temperatures.

A mathematical relationship available in the literature for a thin-magnetic slab in a rectangular waveguide configuration, relates the resonant frequency, applied field, and saturation magnetization as follows:

$$f = 2.8\sqrt{H(H + 4\pi M_s)}$$

where $f$ = the resonant frequency at peak loss in mc./s.
2.8 = the free electron gyromagnetic ratio divided by $2\pi$
$H$ = the applied magnetic field at peak loss
$4\pi M_s$ = the effective saturation magnetization Using the above relationship we have been able to compare experimentally obtained values of $4\pi M_s$ with the values contained in the American Institute of Physics Handbook. These values are given in Table III:

TABLE III.—SATURATION MAGNETIZATIONS

| Film | $4\pi M_s$ (exp.) | $4\pi M_s$ (Lit.) |
|---|---|---|
| Magnetite | 6,800 | 6,000 |
| Nickel Ferrite | 3,600 | 3,400 |
| Cobalt Ferrite | No observed loss.[a] | 5,000 |
| Copper Ferrite | 1,300 | [b] 1,700 |
| Magnesium Ferrite | 1,900 | [b] 1,400 |
| Nickel Zinc Ferrite | 4,600 | |
| Magnesium Manganese Ferrite | 2,600 | |
| Nickel Ferrous Ferrite | 4,000 | |
| Zinc Ferrite | | 0 |
| Manganese Ferrite | | 5,200 |
| Nickel Ferri-aluminate | [c] 3,400 | |
| Nickel Ferri-aluminate | [d] 0 | |

[a] $CoFe_2O_4$ does not absorb radiation in the 9300 mc./s. region because of the high anisotropy.
[b] Values are highly dependent on heat treatment.
[c] Ni $Fe_{2-x}$ $Al_xO_4$, X<0.62.
[d] X>0.62.

Based on the foregoing, it is shown to be possible to prepare ferrimagnetic oxide films of the cubic spinel type and of a wide variety of compositions, by a new technique. By means of X-ray diffractometry and microwave resonance measurements, the films were found to approach the properties of bulk ferrites of the compositions that the films were intended to have.

Having thus described the subject matter of our invention, what it is desired to secure by Letters Patent is:

1. Process for the production of cubic spinel ferrimagnetic oxide films having thicknesses within the range of $10^2$ to $10^5$ Angstroms comprising vacuum deposition of the desired metallic constituents thereof onto a suitable substrate material at a pressure less than $10^{-4}$ mm. Hg and a temperature sufficient to vaporize said metallic constituents at said pressure, thereafter subjecting the metallic film deposited on said substrate to an oxidizing atmosphere at a temperature within the range of 650° C. to 1200° C., effecting thereby the controlled oxidation of said metallic film to a cubic spinel ferrimagnetic oxide structure, and quenching the oxidized film so formed to ambient temperature.

2. Process for the production of cubic spinel ferrimagnetic oxide films having thicknesses within the range of $10^2$ and $10^5$ Angstroms comprising proportioning the desired metallic constituents thereof so as to provide the same atomic ratio of metal atoms as is desired in said film, effecting vacuum deposition of said metallic constituents onto a suitable substrate material at a pressure less than $10^{-4}$ mm. Hg and a temperature sufficient to vaporize said metallic constituents at said pressure, thereafter subjecting the metallic film deposited on said substrate to an oxidizing atmosphere at a temperature within the range of 650° C. to 1200° C., effecting thereby the controlled oxidation of said metallic film to a cubic spinel ferrimagnetic oxide structure, and quenching the oxidized film so formed to ambient temperature.

3. The process as claimed in claim 2, wherein said substrate is an amorphous silicate.

4. The process as claimed in claim 2, wherein said substrate is a crystallized glass.

5. The process as claimed in claim 2, wherein said substrate is a high-alumina ceramic.

6. The process as claimed in claim 2, wherein said substrate is a synthetic mica.

7. The process as claimed in claim 2 wherein said substrate is a $MgAl_2O_4$ single crystal.

8. The process as claimed in claim 2, wherein said substrate is an $Al_2O_3$ single crystal.

9. Process as claimed in claim 2, wherein said metallic constituents are iron and nickel, proportioned in an atomic ratio of 64.6:35.4, and said oxidized film is a nickel ferrite.

10. Process as claimed in claim 2, wherein said metallic constituents and iron and cobalt, proportioned in an atomic ratio of 68.3:31.7, and said oxidized film is a cobalt ferrite.

11. Process as claimed in claim 2, wherein said metallic constituents are iron and copper, proportioned in an atomic ratio of 60:40, and said oxidized film is a copper ferrite.

12. Process as claimed in claim 2, wherein said metallic constituents are iron and magnesium, proportioned in an atomic ratio of 66:34, and said oxidized film is a magnesium ferrite.

13. Process as claimed in claim 2, wherein said metallic constituents are nickel, zinc and iron, proportioned in an atomic ratio of 20.8:24.6:54.6, and said oxidized film is a nickel zinc ferrite.

14. Process as claimed in claim 2, wherein said metallic constituents are manganese, magnesium and iron, proportioned in an atomic ratio of 11:34:55, and said oxidized film is a manganese magnesium ferrite.

15. Process as claimed in claim 2, wherein said metallic constituents are iron, aluminum and nickel, proportioned in an atomic ratio of 31.9:32.8:35.3, and said oxidized film is a nickel ferri-aluminate.

16. Process as claimed in claim 2, wherein said quenching is carried out at a rate within the range of 500° C. per minute to 10° C. per hour.

17. Process for the production of a magnetite cubic spinel ferrimagnetic thin film of the approximate formula $Fe^{II}Fe_2^{III}O_4$ comprising the vacuum deposition of pure iron on a suitable substrate material at a pressure of less than $10^{-4}$ mm. Hg and a temperature of approximately 1000° C., thereafter subjecting the pure iron film deposited on said substrate to an oxidizing atmosphere at a temperature of approximately 1000° C., effecting thereby the controlled oxidation of said film to said magnetite ferrimagnetic oxide film as aforesaid, and quenching said magnetite film in oil at approximately 0° C. immediately thereafter.

References Cited in the file of this patent

UNITED STATES PATENTS

| | | |
|---|---|---|
| 2,671,034 | Steinfeld | Mar. 2, 1954 |
| 2,853,402 | Blois | Sept. 23, 1958 |
| 2,900,282 | Rubens | Aug. 18, 1959 |
| 2,919,207 | Scholzel | Dec. 29, 1959 |
| 2,976,174 | Howard | Mar. 21, 1961 |
| 2,996,418 | Bleil | Aug. 15, 1961 |

FOREIGN PATENTS

| | | |
|---|---|---|
| 670,993 | Great Britain | Apr. 30, 1952 |
| 751,842 | Great Britain | July 4, 1956 |